(12) United States Patent
Linnartz (10) Patent No.: US 9,582,948 B2
(45) Date of Patent: Feb. 28, 2017

(54) BIOMETRIC SYSTEM WITH BODY COUPLED COMMUNICATION INTERFACE

(71) Applicant: KONINKLIJKE PHILIPS N.V., Eindhoven (NL)

(72) Inventor: Johan-Paul Marie Gerard Linnartz, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/442,823

(22) PCT Filed: Nov. 5, 2013

(86) PCT No.: PCT/EP2013/072987
§ 371 (c)(1),
(2) Date: May 14, 2015

(87) PCT Pub. No.: WO2014/075944
PCT Pub. Date: May 22, 2014

(65) Prior Publication Data
US 2015/0317851 A1    Nov. 5, 2015

(30) Foreign Application Priority Data
Nov. 16, 2012  (EP) ................... 12192952

(51) Int. Cl.
*G07C 9/00*  (2006.01)
*G06F 21/32*  (2013.01)
*G06F 21/34*  (2013.01)

(52) U.S. Cl.
CPC ......... *G07C 9/00087* (2013.01); *G06F 21/32* (2013.01); *G06F 21/34* (2013.01);
(Continued)

(58) Field of Classification Search
CPC ........ G07C 9/00087; G07C 2009/0095; G07C 2009/00555; G06F 21/32; G06F 21/34;
(Continued)

(56) References Cited

U.S. PATENT DOCUMENTS 7,278,025 B2 * 10/2007  Saito ..................... G06K 19/07
                                                  713/185
7,394,919 B2 *  7/2008  Rowe .................... G06K 9/0012
                                                  340/5.53
(Continued)

FOREIGN PATENT DOCUMENTS

WO    WO2010064162 A1    6/2010

OTHER PUBLICATIONS

Jean-Paul Linnartz et al., "New Schielding Functions to Enhance Privacy and Prevent Misuse of Biometric Templates", Lecture Notes in Computer Science, vol. 2, 688, Dec. 31, 2003 (Dec. 31, 2003), pp. 393-402, XP002694610.
(Continued)

*Primary Examiner* — Ali Neyzari
(74) *Attorney, Agent, or Firm* — Larry Liberchuk (57) ABSTRACT

A biometric system comprises an identity proving system with a non-volatile memory for storing biometric verification data for a biometric feature of an individual. The biometric system also includes a first body coupled communication interface configured to transmit the biometric verification data via body coupled communication along or through the body of the individual to a second body coupled communication interface. The biometric system further includes an identity verification system comprising a biometric reader configured to measure the biometric feature of the individual to obtain biometric data. The second body coupled communication interface is configured to receive the biometric verification data via the body coupled com-
(Continued)

munication along or through the body of the individual. The biometric reader is arranged so that the second body coupled communication interface is in contact or close proximity to the individual during measurement of the biometric feature by the biometric reader to allow the receiving, and a biometric data verifier configured to verify the obtained biometric data against the biometric verification data.

15 Claims, 4 Drawing Sheets

(52) U.S. Cl.
CPC ............... *G06F 2221/2117* (2013.01); *G07C 2009/00095* (2013.01)

(58) Field of Classification Search
CPC .... G06F 2221/2117; G06F 21/20; G06F 7/04; G06K 9/00026; G06K 9/00979; G06K 7/10346; G06K 19/07749; G06K 9/0002; G06K 9/00067; G06K 9/00087
USPC ...................... 340/5.53, 5.73, 5.83; 382/124
See application file for complete search history.

(56) References Cited

U.S. PATENT DOCUMENTS

| | | | |
|---|---|---|---|
| 8,098,129 B2 | 1/2012 | Falck | |
| 8,165,522 B2* | 4/2012 | Park | H04B 13/005 340/5.8 |
| 8,229,185 B2* | 7/2012 | Ennis | G06K 9/00046 340/5.53 |
| 8,866,760 B2* | 10/2014 | Corroy | H04B 13/005 340/10.42 |
| 8,942,430 B2* | 1/2015 | Ivanov | G06K 9/00006 382/115 |
| 2006/0274920 A1 | 12/2006 | Tochikubo | |
| 2007/0019843 A1 | 1/2007 | Chou | |
| 2009/0267735 A1 | 10/2009 | Kim | |
| 2011/0154485 A1 | 6/2011 | Hyun | |
| 2011/0227856 A1 | 9/2011 | Corroy | |

OTHER PUBLICATIONS

Fazzi A. et al., "A 2.75mW Wideband Correlation-Based Transceiver for Body-Coupled Communication", ISSCC 2009 / Session 11 / TD: Trends in Wireless Communications / 11.5.
Cooper D. et al., "Secure Biometric Match-on-Card Feasibility Report", NIST Interagency Report 7452 p. 2.
Juels A. et al., "A Fuzzy Commitment Scheme", CCS '99: Proceedings of the 6th ACM conference on Comp and Comm Security, Sep. 25, 2013.
Linnartz J.-P. et al., "New Shielding Functions to Enhance Privacy and Prevent Misuse of Biometric Templates," Springer-Verlag 2003.
Dodis Y. et al., "Fuzzy Extractors: How to Generate Strong Keys from Biometrics and Other Noisy Data," Eurocrypt 2004.
Juels A. et al., "A Fuzzy Vault Scheme," Design Code Cryptographer, vol. 38, pp. 237-257, 2006.
Ratha N.K. et al., "Generating Cancelable Fingerprint Templates," IEEE Transactions on Pattern Analysis and Machine Intelligence, vol. 29, No. 4, Apr. 2007, pp. 561-572.
Bazen A.M. et al., "Likelihood Ratio-Based Biometric Verification," IEEE T Circ System Vid, vol. 14, pp. 86-94, 2004.
Chen C. et al., "Multi-Bits Biometric String Generation Based on the Likelihood Ratio," in Proceedings IEEE Int. Conf, 2008.
Linnartz J.-P.M.G. et al., "A Communication-Theoretical View on Secret Extraction", Security with noisy data: on private biometrics, secure key storage and anti-counterfeiting. Berlin: Springer, 2007.
Fazzi A. et al., "A 2.75mW Wideband Correlation-Based Transceiver for Body-Coupled Communication" Proceedings of the IEEE International Solid-State Circuits Conference 2009, ISSCC 2009, Feb. 8-12, 2009.

* cited by examiner

BIOMETRIC SYSTEM WITH BODY COUPLED COMMUNICATION INTERFACE

FIELD OF THE INVENTION

The invention relates to a biometric system comprising a biometric reader configured to measure biometric feature of the individual to obtain biometric data, the biometric data being subject to noise, and a biometric data quantifier configured to map the obtained biometric data to reproducible biometric data under control of biometric verification data so as to reduce the noise from the biometric data.

The invention further relates to a biometric method and a computer program.

BACKGROUND OF THE INVENTION

Biometrics gain increasing interest as a solution to many security issues. In biometrics, a human being is identified by measuring one or more biometric features of the body. Biometric data are said to identify a person based on "who he is", rather than on "what he has" (such as a smartcard) or "what he knows" (such as a password).

Using a biometric system a prover may identify or authenticate himself to a verifier. When a biometric system is used to find or check the identity of a person, there are two options: In identification the identity of the prover is not a priori known, but based on the measured biometric feature, a search is performed in a database to find a match; In verification, the prover not only allows a measurement of his or her biometric feature but also claims what his or her identity is. Biometric features include fingerprint, iris, retina, palm etc.

An unresolved issue, however, is that when deployed at large scale, a citizen looses privacy as he must reveal his identifying biometric data to his bank, to the government, etc. Each of them will obtain the same measured data, and unless special precautions are taken there is no guarantee that none of these parties will ever misuse the biometric data to impersonate the citizen.

In the article "New Shielding Functions to Enhance Privacy and Prevent Misuse of Biometric Templates" of Jean-Paul Linnartz and Pim Tuyls, introduces helper data generating functions to improve on this aspect; the article is further referred to as 'Linnartz'. During an enrollment phase, a prover Peggy receives a biometric template comprising biometric helper data and verification data.

During a usage phase, Peggy allows Victor to take a, possibly noisy, measurement Y=X+N of her biometric feature X; N represents noise. Victor maps the obtained biometric data to reproducible biometric data under control of the biometric helper data so as to reduce the noise from the obtained biometric data. Victor then applies a cryptographic hash function to the reproducible biometric data to obtain an output U, which is compared to a reference authentication response. Here, X, N, and Y are real, or complex, valued vectors.

US patent application US2006/0274920 from O. Tochikubo et al. describes a personal identification device comprising a finger print sensor and, to allow verification, a scanner that receives fingerprint comparison data from a storage medium mounted on a portable device worn on a finger, a wrist, or an ankle of a user. International patent application WO2010/064162A1 by S. Corroy et al. describes a secure identification system in which a user gets access through an identification device or badge or tag worn on his/her body, which applies the techniques of body coupled communication (BCC) to create a kind of aura around the user. An identification (ID) is communicated to a user interface of the secure identification system through BCC communication, and the user is authenticated by the system through an authentication procedure checking the identity of the user on the basis of an assumed secure BCC communication of the ID.

SUMMARY OF THE INVENTION

Removing noise from the obtained biometric data using the helper data allows the use of cryptographic functions such as cryptographic hash functions; however it does create the problem of getting the helper data and/or the verification data at the place where it is needed. Although the use of biometric templates can avoid the need of large databases which reference measurements, say databases of fingerprints, it introduces a new need of to having biometric templates available. The biometric template may be made available in a contact fashion, say stored, say on a smart card which is offered to a card reader, together or close in time to the measurement of the biometric features. This road is cumbersome; since it means two different operations for the user, entering a card in a reader and offering his biometric feature for measurement. The biometric template may also be made available in a contact-less fashion, say wirelessly, from a computing device, but this poses the problem of which wireless signal belongs to which person. Also the use of contact-less card and the like, are less attractive, because the verifier would need to hold that card in his hand, which is clumsy when he presents a fingerprint.

It would be advantageous to have an improved biometric system. A biometric system is provided comprising an identity proving system and an identity verification system.

The invention concerns an identity proving system comprising a non-volatile memory storing biometric verification data specific for a biometric feature of an individual, and a first body coupled communication interface configured to transmit the biometric verification data by means of body coupled communication along or through the body of the individual to a second body coupled communication interface.

The invention further concerns an identity verification system comprising a biometric reader configured to measure a biometric feature of an individual to obtain biometric data, a second body coupled communication interface configured to receive biometric verification data by means of body coupled communication along or through the body of the individual, the biometric reader being arranged so that the second body coupled communication interface is in contact or close proximity to the individual during measurement of the biometric feature by the biometric reader to allow the receiving, and a biometric data verifier configured to verify the obtained biometric data against the biometric verification data. The identity verification system may comprise a biometric data quantifier configured to map the obtained biometric data to reproducible biometric data under control of the biometric helper data so as to reduce the noise from the biometric data.

The identity proving system comprises a non-volatile memory storing biometric verification data for a biometric feature of an individual, and a first body coupled communication interface configured to transmit the biometric verification data by means of body coupled communication along or through the body of the individual to a second body coupled communication interface. The identity verification system comprises a biometric reader configured to measure the biometric feature of the individual to obtain biometric data, the second body coupled communication interface configured to receive the biometric verification data by means of body coupled communication along or through the body of the individual, the biometric reader being arranged so that the second body coupled communication interface is in contact or close proximity to the individual during measurement of the biometric feature by the biometric reader to allow the receiving, and a biometric data verifier configured to verify the obtained biometric data against the biometric verification data.

The identity verification system comprises both a biometric reader and a second body coupled communication interface which are arranged so that the second body coupled communication interface is able to receive interbody communication while the biometric reader is measuring the biometric feature.

By sending verification data from the prover system to the verifier system, the verifier system can execute a verification (e.g. a comparison, matching, near-match etc) in an environment that is trusted by the verifier. This is preferred above a system in which, say the prover system measures the biometric and verifies these against verification data. Such a solution relies on the integrity and hardware security of the prover system, which is often beyond the control of the verifier system.

The biometric verification data was configured for a specific biometric feature, e.g., fingerprint or iris, of a specific individual. The biometric data verifier may be a biometric signal processor. If the biometric data verifier succeeds in verify the obtained biometric data against the received biometric verification data, the identity verification system has established that the individual who is currently in front of the biometric reader was the same individual who was issued the identity proving system, thus his identity is verified. Detailed embodiments contain further improvements and refinements.

Although this is undesirable, typically the biometric data is subject to noise or other disturbances. In an embodiment, the biometric verification data comprises biometric helper data and the identity verification system comprises a biometric data quantifier configured to reduce noise from the obtained biometric data under control of the biometric helper data. The effects of noise or other disturbances are mitigated during the quantization of the measured biometrics by applying the biometric helper data. Preferably, the effect of the noise is mitigated to such an extent that the obtained biometric data is the same on all or substantially all measurements.

When the biometric feature has been measured, the effect of inherent noise can be mitigated by applying the helper data. Biometric data without noise is preferable for many applications but small reproduction imperfections are often inevitable in practice, including both in identification and in verification applications. The problem mainly arises when a person's biometric value lies close to a quantization boundary. Then small imperfections, small amounts of noise can lead to a different digital representation. One way to implement helper data, e.g. in 'Linnartz', is to shift one's natural biometric value to the center of a quantization interval. In such a case, noise is much less likely to change the quantized value after digitization. Helper data can also work purely in the digital domain. An example is the following scheme: the biometrics of one person is a digital string, in which bit errors can occur. Error correction could help, but only if the value of once biometrics happens to be (almost) the same as a code word. However, one's biometrics are not by nature equal to specific code words. However the helper data can translate (shift or bit-wise exor) biometric enrollment string to exactly a code word. If during, verification a few bit errors occurs, the error correction can decode the correct code word. Without the helper data, it is statistically very likely that the biometrics of a person lay between, say somewhere halfway, two code words. Random bit errors would then cause the decoder to pick either one of the nearly code words, but without any guarantee that it always picks the same code word. Helper data may be implemented as a bias that shifts the biometric values away from (digital) decision boundaries. After applying the helper data, biometric data is much better reproducible and allows the use of cryptographic functions.

Another advantage of helper data based noise reduction is that it can accelerate the look-up of biometric data in a database storing multiple previously measured biometric data of multiple individuals. In fact one specific application of the helper data is match a biometric database with the obtained verification string. This is much faster than the near-matches that a system without helper data would need to look for. Moreover, it is vulnerable to different digital representations during enrollment and verification.

When BCC is used as a communication channel it avoids the need for a separate communication channel. By merely touching a fingerprint reader combined with a BCC interface two things are established simultaneously: the biometric fingerprint can be read and a BCC communication message is picked up by the reader.

Furthermore, BCC reduces the impact of interference on/from RF systems, avoids the fading effect that the body has on radio systems and enables power efficient, high data-rate wireless links.

Many types of biometric readers require touch of the individual's body during the measurement of the biometric feature. Examples of biometric features for which a biometric reader may require touch include fingerprint, hand geometry (hand geometry is a biometric that identifies users by the shape of their hands) and palm vein recognition. Other biometric readers may be implemented so that touch is required during measurement; For example, an iris or retina scanner may be configured such that the user places his head so that his cheeks or chin etc touches a reference wall or cup of the scanner. This improves both the accuracy of the scan, by reducing movement of the iris or retina and allows body coupled communication through the touched body part.

The biometric verification data, including possible helper data is both specific for the biometric feature and specific for the individual. An iris scan of a first user requires different biometric verification string and different helper data than an iris scan of a second user. An iris scan of a first user requires different biometric verification data than a palm scan of the first user.

Body Coupled Communication (BCC) is known per se. BCC has been described in, e.g., ISSCC 2009/SESSION 11/TD: TRENDS IN WIRELESS COMMUNICATIONS/ 11.5, "A 2.75 mW Wideband Correlation-Based Transceiver for Body-Coupled Communication", Alberto Fazzi, Sotir Ouzounov, John van den Homberg. Electronic devices in contact or in close proximity to the human body can use its conductive properties to establish body coupled communication (BCC) between each other. BCC, even without direct skin contact, can be realized via two electrode RX/TX devices capacitively coupled to the human body; TX generates a variable electric field while RX senses the variable potential of the body with respect to the environment.

In use, the first body coupled communication interface would be arranged for wearing in contact or close proximity to an individual to allow intrabody communication to the second body coupled communication interface. The individual is typically a human individual, however, the system may also advantageously be applied to identify animals, say life stock, such as cows or horses. For example, nose-prints may be used as a biometric to identify cattle or the blood vessel pattern in the ear of rodents may be used as a biometric.

The two BCC interfaces are in contact or close proximity to the body of the individual to allow communicative coupling between the two interfaces through the body. Some researchers interpret that the communication signals travel along, or via the surface of the body, as opposed to "through" the body. Yet for this invention the precise interpretation is less relevant, as long as the signals are sufficiently strong and well-receivable in the immediate vicinity of the body, and preferably but not necessarily transferred by touch. Typically BCC signals attenuate faster with increasing distance from the body than EM radio communication waves. In addition to electric field BCC, other variants of BCC that can be used for our biometric verification purpose include, but are not limited to, magnetic coupling as it is for instance known to be used to in hearing aids to communicate between the two hearing aids attached to the two ears.

In an embodiment, the non-volatile memory and the first body coupled communication interface of the identity proving system are comprised in the same device; for example, one single body tag which is configured for wearing say in a arm-band, leg-band, wristwatch or the like. In an embodiment, at least the biometric reader and the second body coupled communication interface of the identity verification system are comprised in the same device; for example, one single biometric reading device. The identity proving system is different from the identity verification system.

In an embodiment, the identity proving system comprises control logic configured to transmit the biometric verification (helper) data through the body of the individual to the identity verification system.

In an embodiment, the verification data comprises control biometric data, the control biometric data having been previously obtained by measuring the biometric feature of the individual, the biometric data verifier being configured to verify the obtained biometric data against the control biometric data. For example, the obtained biometric data may be verified against the control biometric data by counting a number of differences, the identity being verified if the number is less than a verification threshold.

In an embodiment, the verification data comprises a verification code, said verification code previously being obtained by applying a cryptographic one-way function to control biometric data, the control biometric data having been previously obtained by measuring the biometric feature of the individual, the biometric data verifier being configured to apply the cryptographic one-way function to the obtained biometric data to obtain a candidate verification code and configured to test if the candidate verification data equals the verification code.

If the candidate verification code equals the verification code it is verified that the biometric verification data indeed matches this individual. Depending on the cryptographic properties of the one way function, different conclusions may be drawn, for example if the one way function is a message authentication function, say a keyed hash function, it may be concluded that the biometric verification data was issued by an entity that knows the key. Note that combination with a signature and trust mechanism may considerably strengthen the conclusion that may be drawn. The trust mechanism may simply be a public key stored at the reader, but may also be, say a certificate linked to a signing authority, etc.

The combination of helper data and a verification code is particularly advantageous. It avoids disclosure of the biometric control data, yet does not require a database.

In a slightly different embodiment, the verification data does not contain helper data, but is simply an encrypted form of the biometric value, as it was measured when the individual was enrolled. The verification system knows the decryption key and retrieves the biometric enrollment data. The verification system also measures the actual biometrics of the candidate. If the actual value and the enrollment value are "sufficiently equal", the verification system accepts the candidate as being genuine. Here "sufficiently equal" implies that a minor difference between actual and enrollment data is attributed to noise or other disturbances, but not seen as a reason to disqualify the candidate. For example, it may be required that a possibly weighted hamming distance between actual value and enrollment value is smaller than a threshold value. The threshold value may be predetermined. The threshold value may depend on the actual applications. If the same system is used for a high security application, a small threshold may used, accepting the occasional false negative in exchange for higher security; for a low security application, a high threshold may used, accepting the occasional false positive in exchange for higher user friendliness.

In an embodiment, the first body coupled communication interface is configured to transmit identity data of the individual for use in an application through the body of the individual to the second body coupled communication interface, which is configured to receive the identity data through the body of the individual, and the identity verification system comprises an identity output unit configured to forward the identity data the application if the candidate verification data equals the verification data, but not if the candidate verification data does not equal the verification data.

The application may be a software application. For example, the biometric system may be used for entrance control. The application verifies if the identity is allowed access to a particular room, building, etc.

In an embodiment, the first body coupled communication interface is configured to transmit a digital signature through the body of the individual to the second body coupled communication interface, which is configured to receive the digital signature through the body of the individual. The identity verification system comprises a digital signature verifier configured to verify the digital signature, wherein the digital signature signs all or at least part of the biometric verification data, preferably also the identity data and optionally also the helper data.

The digital signature is preferably an asymmetric digital signature corresponding to a public, private key pair. An asymmetric digital signature has the property that is may be verified by anyone who knows the public key of the key pair, but can only be made by someone who know the private key of the key pair. This has the interesting advantage that the identity verifying system need only have access to the public key pair for verification, thus one compromised identity verifying system does not comprise other identity verifying systems in the biometric system. For example, the biometric template and/or the identity may be signed during an enrollment phase, say by some authority. The authority may also determine the biometric template, i.e., the biometric helper data and biometric verification data.

In an embodiment, the biometric feature of an individual is a fingerprint of the individual and the biometric reader is a fingerprint reader. Measuring a fingerprint implies contact of the finger, thus the BCC communication may conveniently be done while the measuring takes place.

In an embodiment, the second body coupled communication interface is configured to transmit a request for biometric verification through the body of the individual to the first body coupled communication interface. The identity proving system is configured to transmit the biometric verification data in response to receiving the request for biometric verification through the body of the individual. Such a communication trigger allows most of the identity proving system to sleep most of the time, thus saving energy. In this case, the touch of the user accomplishes three things: a biometric verification request acting as a communication trigger, measuring of the biometric feature and a communication channel for transferring the biometric data, e.g., one or more of the biometric helper data, verification data, identity data and signature data.

In an embodiment, the request for biometric verification comprises a seed for a session key. The identity proving system comprises an encrypting unit configured to encrypt all or at least part of the biometric verification data with the session key before transmission to the identity verification system. The identity verification system comprises a decrypting unit configured to decrypt the encrypted verification data.

The seed may be used directly for encrypting communication. The identify proving system and identity verifying system may also employ a key negotiation protocol, e.g. Diffie-Helman or some variant thereof, wherein the identify proving system may respond with a further seed, after which the identify proving system and identity verifying system both compute the same session key. The identity proving and verifying systems may comprise a random number generator to jointly generate a session key.

The identity proving system may be a so-called tag. The tags are typically mass produced, whereas much fewer readers are needed. For example, the identity proving system may be a tag card for public transport travelers. The identity verification system may be access ports, say to the platform. Tags and/or readers may be produced by several different manufacturers.

The identity proving system and the identity verification system are electronic devices. The identity proving system is a mobile electronic device, it may comprise a battery.

An aspect of the invention concerns biometric methods for use by identity proving systems. A method comprises transmitting biometric verification data using a first body coupled communication interface by means of body coupled communication along or through the body of an individual to a second body coupled communication interface, the biometric verification data being specific for a biometric feature of the individual, for example, biometric helper data being configured to control mapping of biometric data subject to noise to reproducible biometric data by a biometric data quantifier so as to reduce the effect of the noise from the biometric data. The biometric verification data is transmitted from a first body coupled communication interface in contact or close proximity to the body of the individual, to a second body coupled communication interface in contact or close proximity to the body of the individual.

An aspect of the invention concerns biometric methods for use by identity verification systems. A method comprising arranging a biometric reader so that a second body coupled communication interface is in contact or close proximity to an individual during measurement of a biometric feature by the biometric reader to allow receiving biometric verification data using the second body coupled communication interface by means of body coupled communication along or through the body of the individual, and measuring a biometric feature of the individual using a biometric reader to obtain biometric data. The biometric reader and second body coupled communication interface may be comprised in a single device, say in an integrated identity verification system.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code means stored on a computer readable medium for performing a method according to the invention when said program product is executed on a computer In a preferred embodiment, the computer program comprises computer program code means adapted to perform all the steps of a method according to the invention when the computer program is run on a computer. Preferably, the computer program is embodied on a computer readable medium.

Reference is made to so-called match-on-card systems, see, e.g., NIST Interagency Report 7452, 'Secure Biometric Match-on-Card Feasibility Report', page 2. A match on card scenario is as follows: The cardholder presents their card to a contactless biometric reader. The cardholder presents their finger to the biometric scanner. The host establishes a secure session with the card. The host prepares an encrypted fingerprint (image or minutia) and transmits it via contactless interface to the card. The card decrypts the template and compares it with the reference template stored on the card. The card returns a signed result (i.e., Yes/No) to the host.

In a match-on-card system the measured fingerprint is transmitted from the reader to the card, so all calculations need to be done on the card, which implies that more resources are needed at the card. It would be desirable to perform computation intensive operation on the reader instead of the on the card. Match on card systems do not allow the host to control over the matching of the biometric, however by transferring a biometric template to the host, the host does have control over the matching, while at the same time avoiding the indiscriminate broadcasting of one's biometric feature data.

BRIEF DESCRIPTION OF THE DRAWINGS

These and other aspects of the invention are apparent from and will be elucidated with reference to the embodiments described hereinafter. In the drawings.

It should be noted that items which have the same reference numbers in different Figures, have the same structural features and the same functions, or are the same signals. Where the function and/or structure of such an item has been explained, there is no necessity for repeated explanation thereof in the detailed description.

LIST OF REFERENCE NUMERALS IN FIGS. 1-2

110 a BCC tag
210 a authentication system
250 a BCC channel
260 an individual
120 control logic
125 a memory
130 a BCC interface
220 a biometric reader
230 a BCC interface
242 a biometric data quantifier
244 a biometric data verifier
246 an identity output unit
248 a digital signature verifier

DETAILED DESCRIPTION OF THE EMBODIMENTS

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described.

Figure 1:
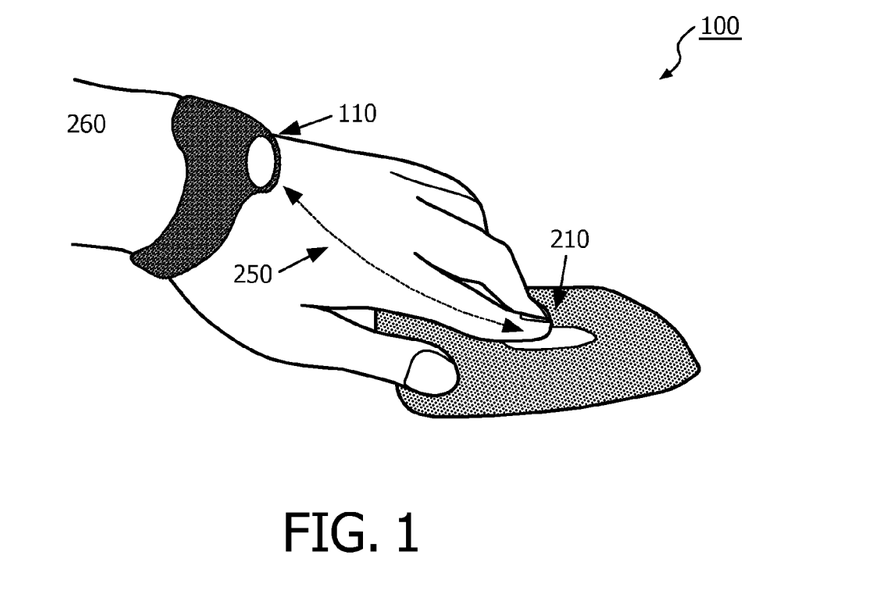
FIG. 1 shows front view of a biometric system 100.
Figure 2:
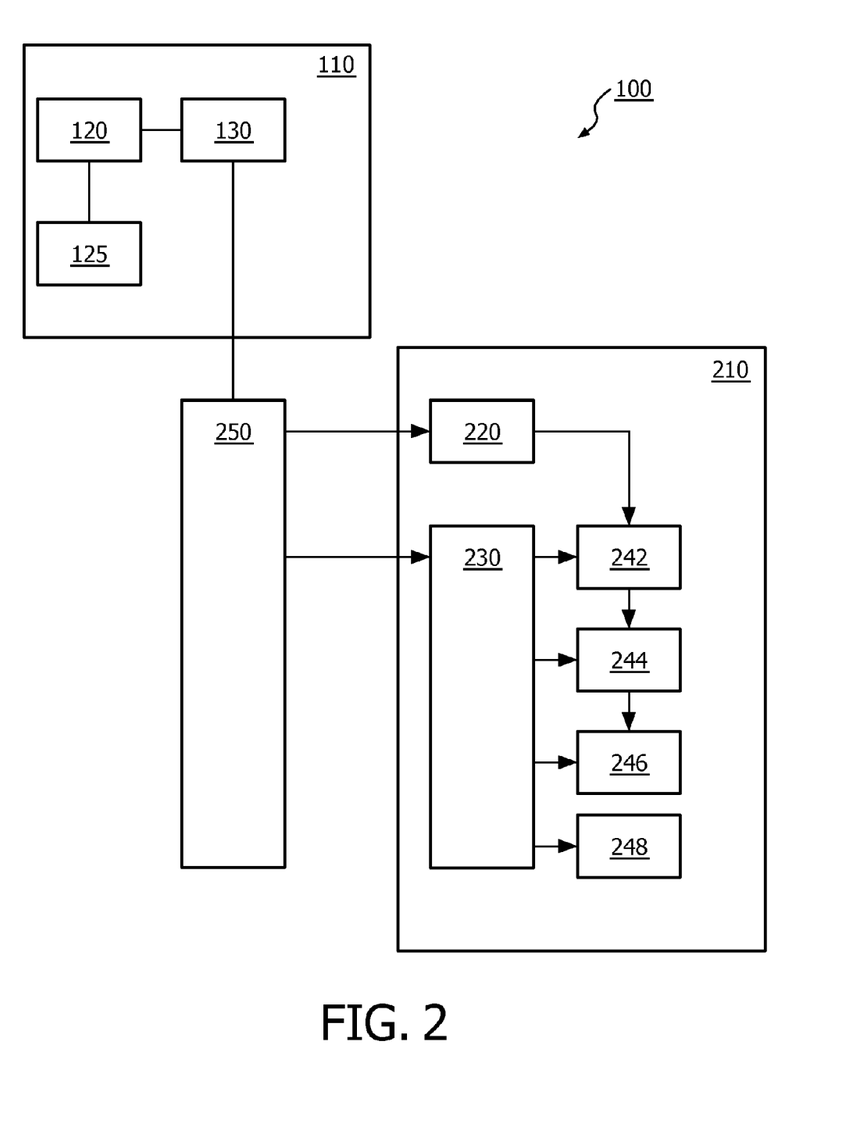
FIG. 2 shows a block diagram of biometric system 100.

FIGS. 1 and 2 illustrate a biometric system 100. The system comprises an identity proving system, here in the form of BCC tag 110 and an identity verification system 210, here in the form of an authentication system 210.

In this case identity proving system 110 is a body-worn identification device which contains data. Identity proving system 110 comprises control logic 120, a memory 125 and a BCC interface 130. The BCC tag as shown is integrated in a wristwatch the individual is wearing, which provides a direct contact of the tag with the individual's skin. A wristwatch is one exemplifying way of wearing the BCC tag. The BCC tag may also be kept close to the skin using an elastic band, or glue, or the like.

Identity verifying system 210 comprises a second BCC interface 230. Between identity proving system 110 and identity verifying system 210 is a BCC channel 250. The BCC channel is a communication channel that runs through the body of the individual. In the case of system 100 the channel runs through the hand and finger of the individual 260 shown in FIG. 1 using system 100. The channel is formed by first BCC interface 130 in identity proving system 110 and second BCC interface 230 in identity verifying system 210. BCC interfaces 130 and 230 may comprise two electrodes, viz., a receiving electrode (RX) and a transmit electrode (TX). The two electrodes may be coupled capacitively to the human body of the individual; TX generating a variable electric field while RX sensing the variable potential of the body with respect to the environment. First BCC interface 130 is at least configured for sending data and second BCC interface 230 at least for receiving data; however in more advanced embodiments, first BCC interface 130 and second BCC interface 230 are both configured for sending and receiving of data.

Wearable electronic tag 110 stores identification data of the individual in memory 125. Memory 125 stores biometric verification data, including biometric helper data, but may also store any other verification data, identity data and a signature over this data. In one embodiment, the identity data and/or signature data is absent. The biometric verification data, including the verification code, identity data and signature are computed specifically for the individual 260 shown in FIG. 1 and stored in memory 125, for example, during an enrollment phase.

Note that biometric helper data is not necessary, for example, the biometric control data may be stored. In that case the obtained biometric data is compared directly to biometric control data, taking into account the noise and other disturbances that may occur. Preferably, when helper data is used, also a verification code is used.

In one embodiment of system 100, identity proving system 110 continuously broadcasts the biometric verification data and possibly other data, e.g., an individual identifier, through body-coupled body communication. In that case identity proving system 110 transmits body-coupled communication as soon as the individual gets into contact with a target device so that a communicative coupling is possible. Alternatively, identity proving system 110 only transmits the data stored in memory 125 when it receives a trigger to do so. The trigger may come from system 210 but may also come from a different source; For example individual 260 may give a trigger, e.g., by pressing a button on system 110.

Identity verifying system 210 comprises a biometric reader 220 for measuring a biometric feature of individual 260. In the system as shown the biometric feature is a fingerprint. Also convenient are hand geometry scanners and palm vein scanners. Somewhat less convenient but still well emendable to system 100 are iris and retina scanners, etc, in which contact with the body is not required but where such contact may easily be arranged during biometric measurement.

Biometric reader 220 and second BCC interface 230 have been arranged in identity verifying system 210 so that when individual 260 uses biometric reader 220 to have his biometric feature measured, he automatically established the required communicative coupling between his body and second BCC interface 230, and thus between first BCC interface 130 and second BCC interface 230. This means that while the biometric feature is measured data may be exchanged at the same time. During the measuring (scanning) control logic 120 sends at least the biometric verification data retrieved from memory 125 to second BCC interface 230, via first BCC interface 130.

Identity verifying system 210 further comprises a biometric data quantifier 242, also referred to as a biometric mapper, to map the biometric data obtained from biometric reader 220 to reproducible biometric data under control of the biometric helper data retrieved from identity proving system 110 through the BCC channel 250. The mapping reduces the effect of, noise from the biometric data, in particular makes the data better reproducible for instance by increasing the probability that the measured data lies near the center of a quantization interval of near a digital code word. One way of making and applying biometric helper data will be described below in connection with FIGS. 3 and 4.

In some embodiment, the noise corrected biometric data is used directly to look up the data in a database, simplifying the system. In the rest of the description we will assume that the biometric data has been configured to remove the noise altogether and that a verification code is used. Note that in exceptional circumstance with high noise, the system may still fail in ensuring that measurement fall in the same interval; this may result in the occasional malfunction of the system. The likelihood of this may be reduced by using larger quantification intervals, error correction, executing a second verification attempt, and the like.

Identity verifying system 210 may further comprise a biometric data verifier 244 configured to apply a cryptographic one-way function to the reproducible biometric data to obtain candidate verification code. The cryptographic one-way function may be a cryptographic hash function, say, SHA-1, or a MAC, say a keyed hash, say HMAC-SHA1. Biometric data verifier 244 is furthermore configured to test if the candidate verification code equals the verification code received from identity proving system 110 over BCC channel 250.

Identity verifying system 210 may further comprise an identity output unit 246 which forward identity data received over BCC channel 250 and which identifies individual 260 to an application, say a software application, in case the test in biometric data verifier 244 succeeds, i.e., when verification code equals the candidate verification code. Verification of the signature may be taken at any point before using e.g. outputting the received identity. For example, system 210 may verify the signature even before correcting the biometric data.

Identity verifying system 210 may further comprise a digital signature verifier 248. Digital signature verifier 248 verifies a digital signature received over BCC channel 250. For example, the digital signature may be an asymmetric signature such as an RSA signature or an ECDSA signature which signs the data received over BCC channel 250, e.g., the biometric data, verification code, and identity data.

Figure 3:
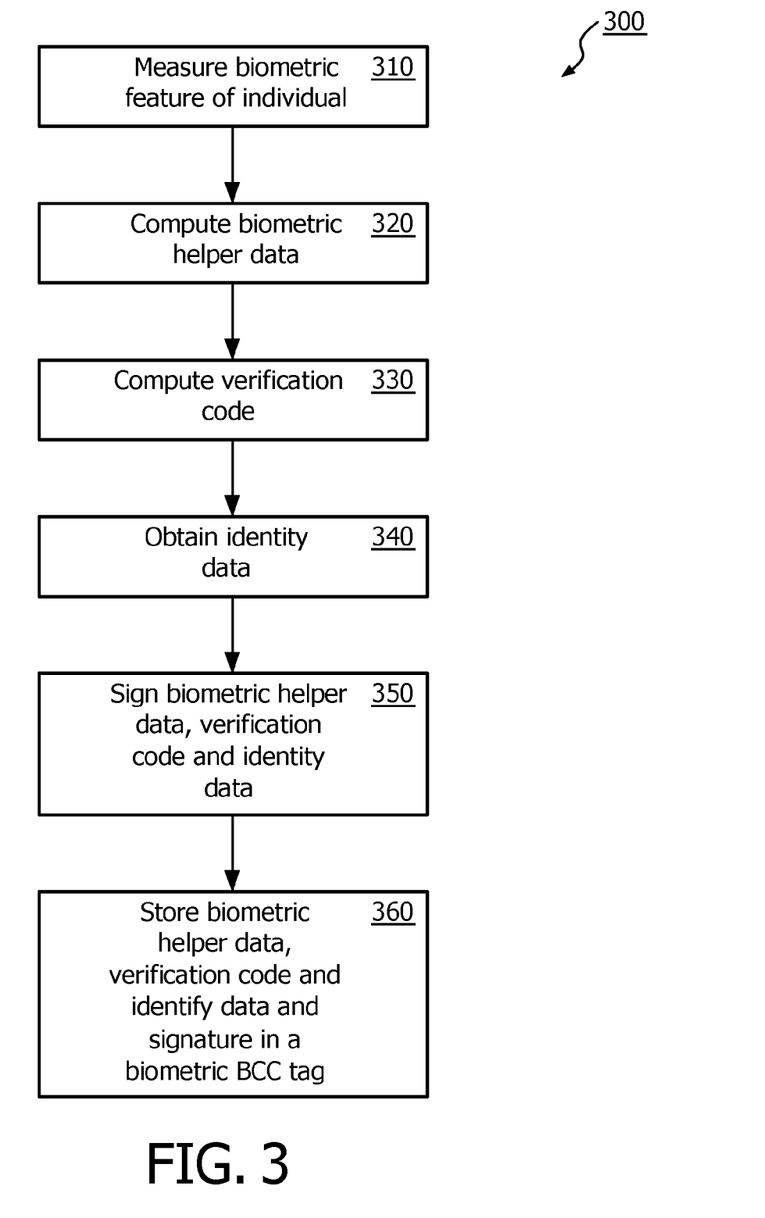
FIG. 3 shows a flow chart illustrating a method of enrollment 300.

FIG. 3 illustrates a method of preparing identity proving system 110 for use, the so called enrollment. In step 310 the biometric feature which the system uses, in case of system 100 a fingerprint, is measured. The biometric data may be in the form of a vector digital data. In Step 320 biometric helper data is computed for the measured biometric data. In optional step 330 the verification code is produced. This may be done by first computing the reproducible biometric data that would be obtained by applying the biometric helper data of step 320 to the biometric data of step 310. A cryptographic one way function, say a hash, is applied to the reproducible biometric data. Intermediate processing may be needed, say concatenation of a vector, padding etc. In optional step 340 identity data is obtained, say queried, or read out of an electronic system, say an electronic passport. The obtained data, i.e., biometric helper data, verification code and identity data is digitally signed to produce a digital signature. Note that we assume a separable signature, but his is not needed, e.g., data and signature may be combined. Finally in step 360 biometric helper data, verification code, identity data and signature are stored in memory 125 of identity proving system 110. Note that neither the biometric data nor the reproducible biometric data is stored on identity proving system 110. The (reproducible) biometric data is not even derivable from only the data stored in memory 125. Interestingly, even though the reproducible biometric data is not stored in memory 125, one could include the reproducible biometric data in the data over which the signature is computed; this assumes a separable signature. When the reproducible biometric data is included in the signature, but not in the data which is transferred from system 110 to system 210, one may even leave out the verification code, as the verification of the signature already provides assurance that biometrics corresponds to the BCC tag. A separable signature may separated from the data which it signs, and does not allow the signed data to be reconstructed.

An example of an embodiment without verification code is a biometric system comprising an identity proving system comprising a non-volatile memory for storing biometric authentication data, the biometric authentication data including biometric helper data for a specific biometric feature of an individual and a digital signature, the digital signature signing at least the biometric helper data and reproducible biometric data, and a first body coupled communication interface configured to transmit through the body of the individual to a second body coupled communication interface the biometric authentication data, and an identity verification system comprising a biometric reader configured to measure the biometric feature of the individual to obtain biometric data, the biometric data being subject to noise, the second body coupled communication interface configured to receive the biometric authentication data through the body of the individual, the biometric reader being arranged so that the second body coupled communication interface is in contact or close proximity to the individual during measurement of the biometric feature by the biometric reader to allow the receiving, and a biometric data quantifier configured to map the obtained biometric data to reproducible biometric data under control of the biometric helper data from the received biometric authentication data so as to reduce the noise from the biometric data, and a digital signature verifier configured to verify the digital signature from the received biometric authentication data at least over the biometric helper data from the received biometric authentication data and the reproducible biometric data obtained by the biometric data quantifier.

Figure 4:
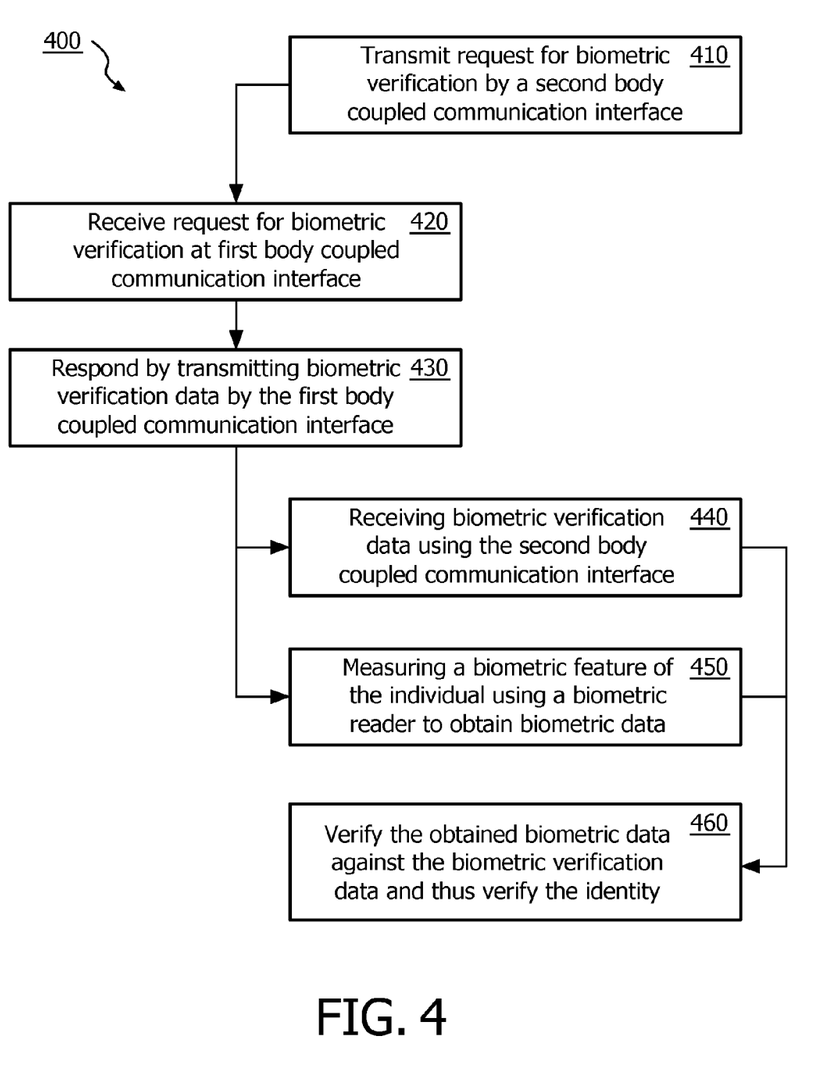
FIG. 4 shows a flow chart illustrating a biometric method 400.

FIG. 4 illustrates a biometric method 400 which may use identity proving system 110 and identity verifying system 210. In step 410, a request for biometric verification is transmitted by a second body coupled communication interface 230, say by identity verifying system 210. In Step 420, the request for biometric verification is received at first body coupled communication interface 130, say be identity proving system 110. Steps 410 and 420 are optional, for example, identity proving system 110 may continuously broadcast the biometric verification data. In response to the request (if a request is used), in step 430, biometric verification data is transmitted by the first body coupled communication interface, e.g., by identity proving system 110.

In step 440 biometric helper data is received using the second body coupled communication interface 230 and in step 450 the biometric feature of the individual is measured using a biometric reader to obtain biometric data. Steps 440 and 450 are substantially in parallel, i.e., occur at the same time or at least have a large overlap, or one of steps 440 and 450 overlaps the other in time. Thus the amount of time needed to obtain both biometric helper data and biometric data is smaller than what would be needed by receiving one after the other. Even if steps 440 and 450 do not overlap, still a second communication channel, such as a contactless card is avoided.

In step 460, the obtained biometric data is verified against the biometric verification data to verify the identity. If biometric helper data was included in the biometric verification data then the obtained biometric data is mapped to reproducible biometric data by a biometric data quantifier under control of the biometric helper data so as to remove the noise from the biometric data.

The reproducible biometric data may be used in a variety of ways. For example, it may be looked up in a database of biometric data. Or it may be further processed with a cryptographic operation, for example, such as described herein. Cryptographic operations have the property that even a one-bit difference in the input generally has a largely different output. For this reason the use of such cryptography may require reproducible biometric data.

Below one way to implement biometric helper data and verification code is given. Other options are possible.

When individual 260 enrolls for the biometric verification system, the biometric feature, say fingerprint, X of individual 260 is measured. Here X is a representation with some disturbances. This fingerprint is quantized by quantization function Q, as Z=Q(X), such that Z describes the middle of the quantization interval in which X lies. For example, X may be a vector and each component of the vector may be quantized.

The quantization function maps a high resolution variable, e.g., a vector component, to a lower resolution variable. For example, Q may be defined by a series of intervals spanning the domain of a component. The center of interval in which the component lies is the quantized value of the component. After quantization, the number of distinct values a variable can assume is reduced, often considerably. Moreover, after quantization a variable lies in the center of a quantization interval.

The enrollment system calculates two values, the helper data W=X−Q(X), and the verification code S=Hash(Q(X)). Identity data P is obtained say from a passport of individual 260. The enrolment system then signs the data string [W, S, P] by adding a certificate and a signature C. The certificate is optional. The values W, S, P, C are stored in a BCC tag 110, e.g., as a concatenated string, which is given to individual 260.

Individual 260 is now ready to prove his identity in verification systems, such as identity verifying system 210.

Identity verifying system 210 measures the biometric features, i.e., the fingerprint X' and received the data W,S,P,C via a body coupled communication channel 250. It checks whether the signature C is valid for W,S,P. If the signature is not valid, the process aborts, possibly taking appropriate action, such as raising an error. The biometric data obtained by biometric reader 220 may be kept even in case of a bad signature. A bad signature may indicate illegal tampering with the device; the fingerprint may be used as evidence.

Next, verification system calculates X'−W and quantizes this with Q, and hashes this. In other words, it calculates S'=hash(Q(X'−W)) and checks whether S=S'. If S=S' it accepts that Peggy has the identity as described in P. Here the function Q(X−W) is a delta contraction function G(X, W). Other delta contracting functions are possible, see, e.g., Linnartz and publications referring to this paper.

Note that the verifier obtains Q(X'−W)=Q(X'−(X−Q(X)))= Q((X'−X)+Q(X)). Since Q(X) lies in the center of a quantization interval and (X'−X) is small, i.e., in the order of the noise, Q((X'−X)+Q(X)), is likely to be equal to Q(X). Note also that W does not give information on X or Q(X).

Typically, the device 110 and the 210 each comprise a microprocessor (not separately shown) which executes appropriate software stored at the device 110 and the 210, e.g. that the software may have been downloaded and stored in a corresponding memory (not shown).

Many different ways of executing biometric methods as described herein are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. For example, steps 330 and 340 or steps 440 and 450 may be executed, at least partially, in parallel. Moreover, a given step may not have finished completely before a next step is started.

A method according to the invention may be executed using software, which comprises instructions for causing a processor system to perform method 300 or 400. Software may only include those steps taken by a particular sub-entity of the system, e.g., system 110 or 210. The software may be stored in a suitable storage medium, such as a hard disk, a floppy, a memory etc. The software may be sent as a signal along a wire, or wireless, or using a data network, e.g., the Internet. The software may be made available for download and/or for remote usage on a server.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A biometric system, comprising:
   a biometric reader configured to measure a biometric feature of an individual to obtain biometric data, the obtained biometric data being subject to noise;
   a non-volatile memory for storing biometric verification data specific for the biometric feature of the individual, the biometric verification data including biometric helper data to reduce noise from the biometric data obtained by the biometric reader, and
   a first body coupled communication interface configured to transmit the biometric verification data via body coupled communication along or through the body of the individual to a second body coupled communication interface.

2. The biometric system of claim 1, wherein:
   the second body coupled communication interface is configured to receive the biometric verification data via the body coupled communication along or through the body of the individual, the biometric reader being arranged so that the second body coupled communication interface is in contact or close proximity to the individual during measurement of the biometric feature by the biometric reader to allow the receiving, and a biometric data verifier configured to verify the obtained biometric data against the biometric verification data.

3. The biometric system as in claim 2, wherein the verification data comprises control biometric data, the control biometric data having been previously obtained by measuring the biometric feature of the individual, the biometric data verifier being configured to verify the obtained biometric data against the control biometric data.

4. The biometric system as in claim 2, wherein the verification data comprises a verification code, the verification code previously being obtained by applying a cryptographic one-way function to control biometric data, the control biometric data having been previously obtained by measuring the biometric feature of the individual, the biometric data verifier being configured to apply the cryptographic one-way function to the obtained biometric data to obtain a candidate verification code and configured to test if the candidate verification data equals the verification code.

5. The biometric system as in claim 2, wherein the verification data comprises identity data identifying the individual, the identity data being for use in an application, the biometric system further comprising an identity output unit configured to forward the identity data to the application if the biometric data verifier verified the biometric verification data.

6. The biometric system as in claim 2, wherein the verification data comprises a digital signature, and wherein the biometric system further comprises a digital signature verifier configured to verify the digital signature, wherein the digital signature signs at least part of the verification data.

7. The biometric system as in claim 2, wherein the biometric feature of the individual is a fingerprint of the individual and the biometric reader is a fingerprint reader.

8. The biometric system as in claim 2, wherein
the second body coupled communication interface is configured to transmit a request for biometric verification via the body coupled communication along or through the body of the individual to the first body coupled communication interface,
the biometric system being further configured to transmit the biometric verification data via the body coupled communication along or through the body of the individual in response to receiving the request for biometric verification via the body coupled communication along or through the body of the individual.

9. The biometric system as in claim 8, wherein the request for biometric verification comprises a seed for a session key, the biometric system comprising an encrypting unit configured to encrypt at least part of the biometric verification data with the session key before transmission to the identity verification system, the identity verification system comprising a decrypting unit configured to decrypt the encrypted verification data.

10. A biometric method, comprising:
transmitting a biometric verification data via body coupled communication using a first body coupled communication interface along or through an individual to a second body coupled communication interface, the biometric verification data being specific for a biometric feature of the individual, the biometric verification data being configured to be verified against biometric data obtained from a biometric reader configured to measure the biometric feature of the individual, the biometric verification data comprising biometric helper data to reduce noise from the biometric data obtained by the biometric reader configured to measure the biometric feature of the individual.

11. A biometric method, comprising:
arranging a biometric reader so that a second body coupled communication interface is in contact or close proximity to an individual during measurement of a biometric feature by the biometric reader to allow simultaneous measuring of the biometric feature of the individual using the biometric reader to obtain biometric data, and
receiving biometric verification data via body coupled communication using the second body coupled communication interface along or through the individual, the biometric verification data comprising biometric helper data to reduce noise from the biometric data obtained by the biometric reader configured to measure the biometric feature of the individual.

12. The biometric system as in claim 1, wherein the biometric system is located in a wristwatch.

13. A non-transitory computer readable medium for storing instructions, when executed by a processor, to perform acts comprising:
transmitting biometric verification data via body coupled communication using a first body coupled communication interface along or through an individual to a second body coupled communication interface, the biometric verification data being specific for a biometric feature of the individual; and
verifying the biometric verification data against biometric data obtained from a biometric reader configured to measure the biometric feature of the individual, the biometric verification data comprising biometric helper data to reduce noise from the biometric data obtained by the biometric reader configured to measure the biometric feature of the individual.

14. The biometric system as in claim 1, wherein the biometric system is an identity proving system.

15. The biometric system as in claim 1, wherein the biometric system is an identity verification system.

* * * * *